United States Patent [19]

Narvhus et al.

[11] Patent Number: 4,598,352
[45] Date of Patent: Jul. 1, 1986

[54] CONTROLLED PARALLEL CONVERTER PLANT

[75] Inventors: Ingar Narvhus, Kolbotn; Jan P. Mikalsen, Trondheim, both of Norway

[73] Assignee: International Standard Electric Corporation, New York, N.Y.

[21] Appl. No.: 605,710

[22] Filed: Apr. 30, 1984

[30] Foreign Application Priority Data

May 2, 1983 [NO] Norway .................................. 831540

[51] Int. Cl.⁴ ............................................. H02M 7/04
[52] U.S. Cl. ......................................... 363/69; 363/70
[58] Field of Search ...................... 363/67, 69, 70, 71, 363/72; 307/82

[56] References Cited

U.S. PATENT DOCUMENTS

| | | | |
|---|---|---|---|
| 3,549,977 | 12/1970 | Watkins | 363/71 |
| 3,621,365 | 11/1971 | Beck et al. | 363/71 |
| 4,270,165 | 5/1981 | Carpenter et al. | 307/82 |
| 4,276,590 | 6/1981 | Hansel et al. | 363/71 |
| 4,425,613 | 1/1984 | Shelly | 363/71 |

OTHER PUBLICATIONS

Bowers, "Precision Rectification", Electronic Eng., pp. 71+, Jun. 1980.

*Primary Examiner*—William H. Beha, Jr.
*Attorney, Agent, or Firm*—John T. O'Halloran

[57] ABSTRACT

The electrical converter or inverter plant comprises several converter modules arranged in parallel between a power supplying line and a power consuming line. Each converter module includes a power converting unit being controlled by a control circuit which monitors the current and the voltage applied from the module itself to the load line. All functions of the plant are completely distributed among the converter modules so that no central arrangement exists. To coordinate the operation of the different modules there is provided one common current (voltage) balance bus to which all the control circuits are connected. The arrangement is constructed so that the voltage on the common current (voltage) balance bus shall be proportional to the current (voltage) provided to the load line from the module which produces the largest load current (voltage). This is obtained in a simple manner by connecting each control circuit with the common balance bus via an idealized diode.

3 Claims, 3 Drawing Figures

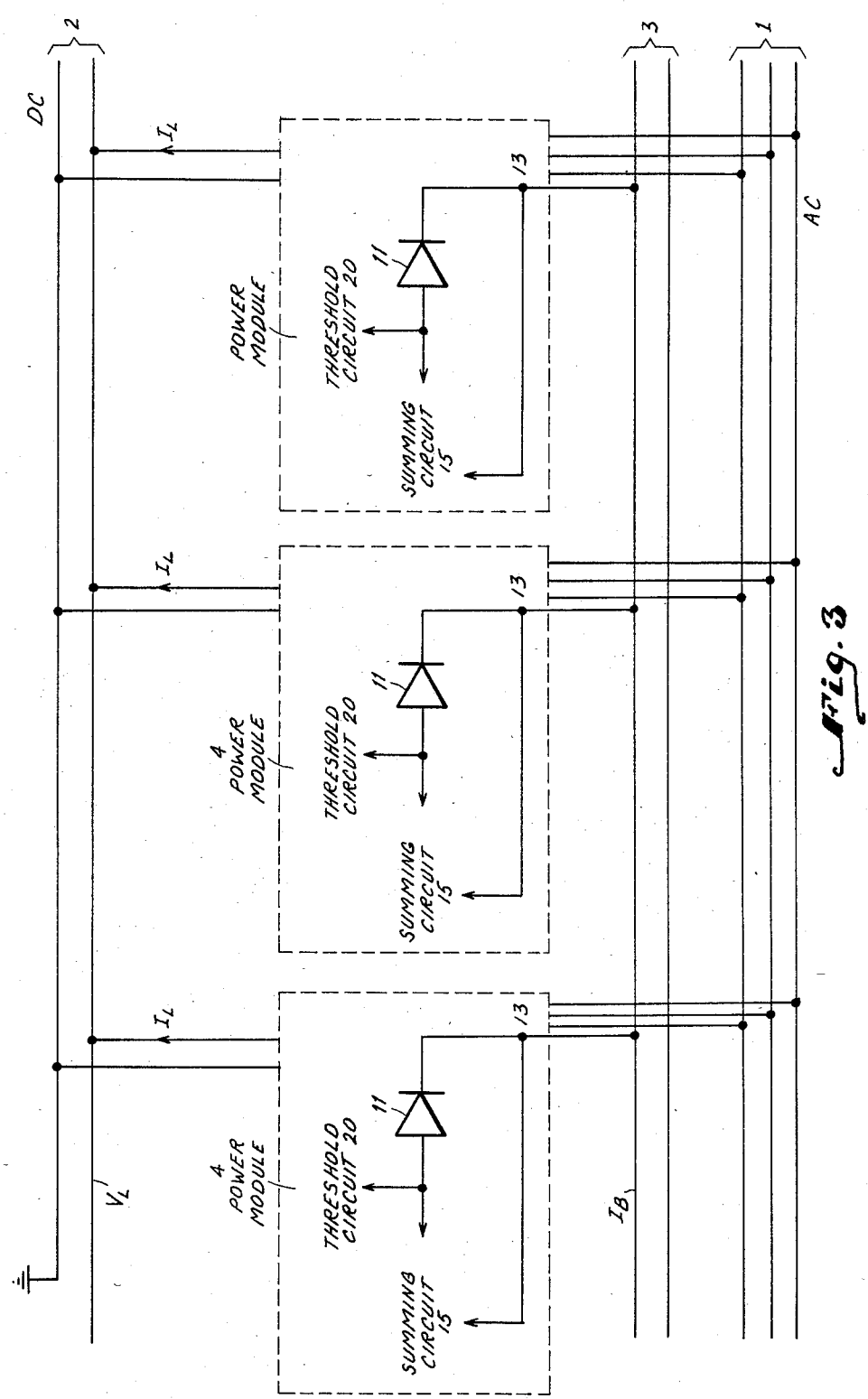

CONTROLLED PARALLEL CONVERTER PLANT

BACKGROUND OF THE INVENTION

The present invention relates to electrical converter plants (possibly also including inverters), and in particular to plants comprising at least two converters arranged in parallel between a power supplying line and a power consuming line or load line. Each converter applies a voltage in a narrow predetermined voltage range to the load line, and each converter comprises a control circuit which generates a stabilized output voltage.

Such plants with converters working in parallel on a common load are well known.

Known plants are usually controlled by a common relay-operated control circuit and often work according to a master-slave principle. In this arrangement the master unit is always active, while the slave units, controlled by the control circuit, are switched on/off according to changes in the load.

In such systems the master unit will be exposed to harder working conditions than the slave units. Errors, therefore, more often will occur in the master unit and such errors often will put the whole plant out of operation. Errors in the common control circuit will also be disastrous to the complete system. Another drawback is that if such master-slave systems are to be expanded, a great deal of connecting work has to be done, not only in the new units themselves, but also in the existing "old" system.

A different solution is shown in the U.S. Pat. No. 4,276,590. This patent relates to a modular power system. Each module comprises an inverter and means to determine the current to a common load from the module itself. A difference circuit is also provided to determine the difference between the module supplied current and the average of the currents supplied by the other modules. This difference is utilized to adjust the pulse width of the inverter circuit to equalize the output power.

A system as described in the above mentioned U.S. Patent incorporates only two modules, but can, according to the patent, be expanded by connecting several additional, identical power modules in parallel. Then the additional power modules have to include connections from the corresponding filter network therein, connections to a common synchronizing network and a separate output voltage sensing line.

However, the system has clearly been designed for two modules only. If several modules are connected in parallel, problems will arise due to mutual inter-module currents, and the control sections incorporated in each module must be rather complex and expensive units.

Another drawback with this and similar systems is that the output current and not the output voltage is adjusted. This in spite of the fact that a constant output voltage is desired.

SUMMARY OF THE INVENTION

The main object of the present invention is to obtain a parallel coupled plant of several converter modules being arranged so that the above disadvantages are avoided.

A feature of the present invention is the provision of an electrical converter plant comprising: at least two converter modules connected in parallel between a power supplying line and a power consuming load line; each of the modules including a control section to continuously control the amount of power converted therein and supplied to the load line, the control section responding to a first control signal proportional to current (voltage) its associated one of the modules supplies to the load line, the control sections including an idealized diode connecting the control section to a common current (voltage) balance bus interconnecting all of the control sections, the balance bus having thereon a representation of the current (voltage) of the first control signal provided by the module which delivers the highest current (voltage) to the load line.

By using a converting plant according to the present invention the following advantages are obtained:
the plant becomes very flexible
in addition to the connections to the power line and the load line, only one single connection has to be established, namely, to a common current balance or current control bus (physically this connection also includes a ground connection, not shown),
when the system is to be expanded, new additional modules may be added in parallel without undertaking any changes in the system design,
converter modules having different maximum currents may be interconnected in one single plant,
if any of the modules should fail, the remaining ones will automatically take over and share the total load equally between them,
no priority range exists, all modules are equally important and are working at the same level. All of the modules therefore, will be utilized to the same extent and all of the modules have the same error probability.

When any of the converter modules fail, the defective unit may be disconnected and repaired without disturbing the plant.

All the equally arranged modules are working at the same rate related to their maximum working ability. This "solidarity" principle ensures that none of the modules are extremely hard stressed.

If one of the modules fails, no matter which, this will not disturb the remaining modules in their operations and none of them will be overloaded. The remaining modules will smoothly adjust to the new working conditions and shall continue to share the total load equally.

BRIEF DESCRIPTION OF THE DRAWING

Above-mentioned and other features and objects of this invention will become more apparent by reference to the following description taken in conjunction with the accompanying drawing, in which:

FIG. 3 is a functional block diagram of a multiplicity of the modules shown in FIG. 1.

DESCRIPTION OF THE PREFERRED EMBODIMENT

Figure 1:
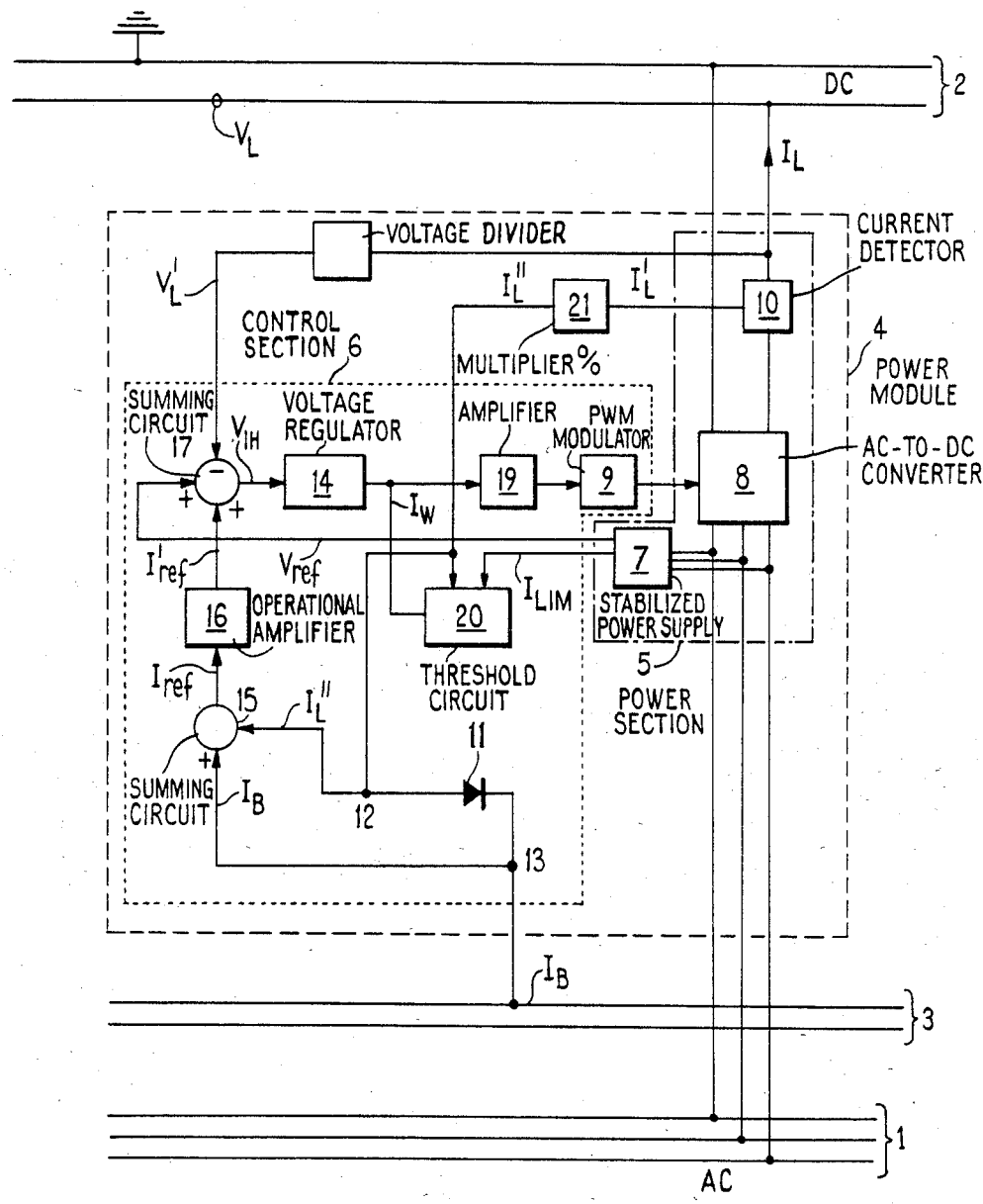
FIG. 1 is a functional block diagram of one module and its connections according to the principles of the present invention.

Referring to FIG. 1, there is shown one embodiment of a single power module constructed according to the present invention, represented by a block diagram where each block corresponds to a certain function.

The power module 4 is arranged between the power line 1 and the load line 2. Module 4 is constructed to receive power from the power line 1 and convert the power into a different mode and supply it to the load line 2 connected to the load (not shown).

There may be several such modules 4 connected in parallel between the power line 1 and the load line 2. Since each module is independent of the remaining ones, only one is shown. Should more modules be required, they simply would be connected in an identical manner as the one module shown to the two lines 1 and 2, and to the common current balance bus 3. To obtain a flexible arrangement each module can have a rather small capacity, and as a practical example more than twenty modules can be incorporated in a single plant. However, the number of modules may, theoretically, be unlimited.

The module 4 includes two main parts. A power section 5 and a control section 6. In the power section 5 a converter 8 receives A.C. power direct from the mains 1 and provides converted D.C. power to the load line 2. (The load itself is not shown). The converter 8 is controlled by control signals from the control section 6 via a modulator 9 which e.g. may be a pulse width modulator (PWM) circuit.

It should be noted that the signals referred to below using symbols $I_L$, $I_{ref}$ etc., are voltages which are representatives of the corresponding currents.

From the power section 5 the control circuit 6 receives, direct or indirect, two information signals: $I_L'$ which represents the current $I_L$ delivered to the load line 2 from the module 4 and $V_{L'}$ related to the voltage $V_L$ on the load line, and two constant signals, $V_{ref}$, which is a constant reference voltage, and $I_{LIM}$, which represents the maximum current which this specific modular unit can provide the load. In addition, there is, in the control process, used a signal $I_{ref}$ related to the voltage difference between the voltage $I_B$ supplied to the current balance bus 3 (from this specific module or from one of the other modules in the plant) and the voltage $I_{L''}$ as sensed on the input side, in this very unit, of an idealized diode 11 connected to the current balance bus 3.

The signal $I_L'$ is detected in the current detector 10, which may be a simple shunt. The signal $V_L$ is sensed direct from the load line 2, e.g. via a simple voltage divider, and the signal $I_{ref}$ obtained in summing circuit 15 represents, as mentioned, the difference between the voltages $I_L''$ and $I_B$, and from $I_{ref}$ the signal $I_{ref}'$ is obtained by operational amplifier 16.

Since all the modules are connected to the common current balance bus (or loop) 3 via substantially identical idealized diodes 11, only the specific module which provides the highest voltage $I_L''$ to its respective point 12, supplies current to the common current balance bus 3. In this very module there will, due to the idealized diode effect, not be detected any voltage difference between the points 12 and 13. Therefore, no change occurs in the voltage input $V_{IN}$ to the voltage regulator 14, since $I_{ref} = I_B - I_L'' = 0$, and since both $V_{ref}$ and $V_L'$ may be considered as being constants.

In all of the other modules the corresponding voltage $I_L''$ at point 12 is less than voltage $I_B$ (at point 13). Therefore, there will be obtained a small correction voltage $I_{ref}$ which affects the voltage a junction point or summing circuit 17. The voltage output from these modules, therefore, will be incremented until the voltage difference between points 12 and 13 is reduced to approx. zero in these modules too.

The control loop explained above represents the main equalizing system of the plant. By this control system, employing simple circuitry and a few interconnections, there is obtained a converter plant with all the advantages mentioned above.

Since diode 11 is an idealized diode there can exist substantially no voltage difference across the diode in its forward direction while the voltage difference across the diode in its backward direction may be considerable. As a consequence of this, the current will pass through the diode 11 and "charge" the balance bus until the voltage on the bus (point 13) corresponds to the input voltage to the diode 11 (point 12). In other words: Only that module which provides the highest current $I_L$ to the load line 2 shall supply a current to the balance bus 3.

The idealized diode 11 may be said to be the most vital component of the module to obtain almost equal current sharing between all the modules. It is essential that the idealized diodes in all the modules of the plant are substantially identical. Each idealized diode may, however, in a practical and inexpensive implementation be realized by a standard quality diode arranged in the feedback path of a precision operational amplifier. By using this implementation the voltage drop across the idealized diode is reduced to the offset voltage in the operational amplifier.

The box 7 represents a duly stabilized power source for both the reference voltage $V_{ref}$ which is transmitted to the junction point 17, and for the signal $I_{LIM}$, which represents the maximum load current allowed from this particular module.

The signal $I_{LIM}$ (which is a voltage) is led to the threshold circuit 20 together with the signal $I_L''$, which represents the current $I_L$ supplied from this module towards the load.

The threshold circuit 20 will act as follows: If $I_L'' < I_{LIM}$ the $I_{LIM}$ signal shall not have any influence on the control signal transmitted towards amplifier 19.

Figure 2:
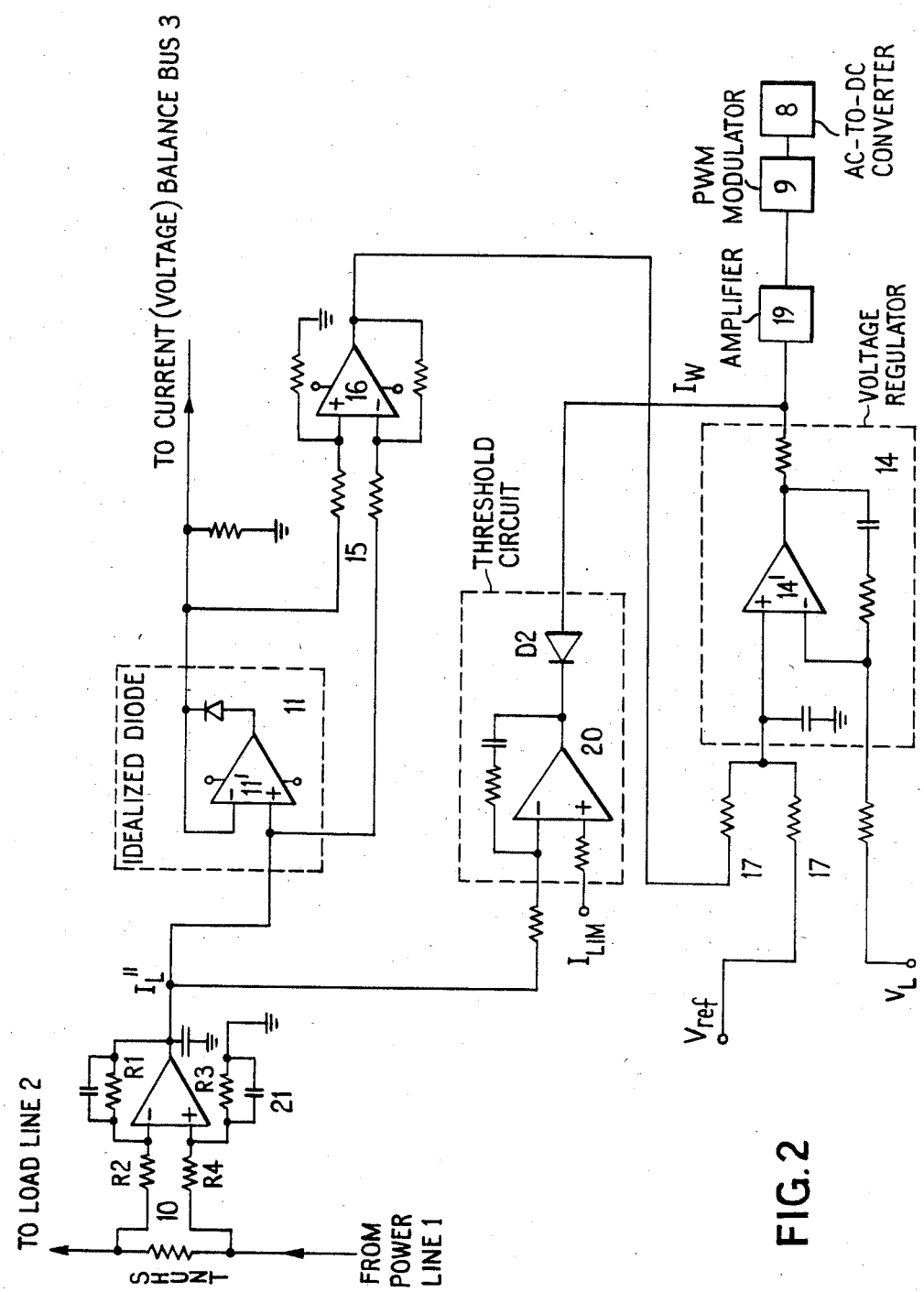
FIG. 2 is a more detailed representation of a module according to FIG. 1.

An embodiment of the threshold circuit 20 is shown in FIG. 2. The threshold effect is simply obtained by the diode D2. From the FIG. 2 implementation it is clear that if $I_L'' > I_{LIM}$ the output level from the operation amplifier in circuit 20 should become negative and, therefore, limit the control signal from the operational amplifier in regulator 14 towards PWM 9. But if $I_L'' < I_{LIM}$ the output signal from the operational amplifier in circuit 20 shall go positive and $I_{LIM}$ shall not affect the control signal towards PWM 9.

The circuit 21 may be a constant multiplication circuit. The object of this multiplicator is to allow modules having different maximum load currents to be combined in a common plant. The output signal $I_L''$ from this multiplicator circuit 21 will be identical in all modules when the load current $I_L$ corresponds to the same percentage of maximum load current. In this simple manner it is, therefore, obtained that each individual module is equally heavy stressed related to its specific maximum capacity.

In FIG. 2 is shown how this multiplicator may be realized. By selecting a proper relationship among the resistors R1, R2, and R3, R4 the proper multiplicator factor for this specific module may be obtained.

Due to this arrangement each module will be controlled to only deliver current as a certain percentage of the maximum current from just this module. Therefore, modules having different maximum current values can be combined in one plant.

In FIG. 2 is shown a simple realization of the block diagram of FIG. 1. The same reference numbers are used as in FIG. 1 for identical blocks. As shown, the implementation is mainly built up from operational amplifiers and resistors. Where the operational amplifiers are coupled in a symmetrical arrangement it is essential that the symmetrically arranged resistors are matched within narrow limits. This is in particular important for the operator amplifier 16 (FIG. 2).

FIG. 3 is a functional block diagram showing three of the power modules shown in FIG. 1 and their interconnections with the AC means and DC load. Elements equivalent to those shown in FIG. 1 are designated by the same reference numerals. Thus the figure shows three of the power modules 4 connected in parallel between the AC means 1 and the common DC load 2. Each of the identical power modules 4 contains an idealized diode 11 which operates in the manner described in detail with regard to FIGS. 1 and 2.

The arrangement shown refers to an AC/DC converter plant. However, the principles may be used in all type of converter plants where it is desirable to use several units operating in parallel mode.

While the embodiment shown refers to a plant where the voltage is controlled in a variable current (constant voltage) plant, this principle is also applicable for controlling the current delivered from constant current modules. Such a realization may e.g. be useful for electrolysis. When the plant is used to control the current, the construction in FIG. 1 can preferably be changed as the sensed current is lead to junction point or summing circuit 17 and the sensed voltage is lead to threshold circuit 20. (Currents are replaced by voltages and vice versa).

We claim:

1. An electrical converter plant comprising:
   a plurality of converter modules connected in parallel between an AC power supplying line and a power consuming load line wherein each of said converter modules comprises:
   an AC to DC converter connected between said power supplying line and said power consuming load line;
   a current sensor connected to an output of said AC to DC converter;
   a multiplicator circuit whose input is connected to an output of said current sensor and which produces an output proportional to the maximum load current for the AC to DC converter;
   a threshold circuit having an input connected to an output of said multiplicator circuit and another input connected to a constant current signal proportional to said maximum load current for the AC to DC converter, said threshold circuit having an output connected to said AC to DC coverter and functioning through said output to limit the load current for said AC to DC converter to a maximum;
   a voltage divider having an input connected to an output of said AC to DC converter and an output connected to a first summing circuit;
   said first summing circuit which has an input from said voltage divider, an input from a stabilized reference voltage circuit, and an input from an operational amplifier and which has an output to said AC to DC converter;
   said stabilized reference voltage circuit which has a plurality of inputs connected to said AC power supply line;
   said operational amplifier which has an input connected to a second summing circuit;
   said second summing circuit which has an input connected to the cathode of said idealized diode and another input connected to the anode of said idealized diode and to said common current balance bus; and
   an idealized diode whose cathode is connected both to said output of said multiplicator circuit and to a second summing circuit and whose anode is connected to a common current balance bus and for which the voltage is approximately zero between the cathode and the anode while said electrical converter plant is in operation.

2. The electrical converter plant of claim 1 wherein each converter module further comprises a voltage regulator, an amplifier, and a pulse width modulator connected in series with each other and between said first summing circuit and said AC to DC converter.

3. The electrical converter plant of claim 1 wherein said idealized diode comprises an operational amplifier and an ordinary diode connected in the negative feedback path of the operational amplifier.

* * * * *